United States Patent
Winters et al.

(10) Patent No.: US 10,659,299 B1
(45) Date of Patent: May 19, 2020

(54) MANAGING PRIVACY SETTINGS FOR CONTENT ON ONLINE SOCIAL NETWORKS

(71) Applicant: Facebook, Inc., Menlo Park, CA (US)

(72) Inventors: Kelly B. Winters, San Francisco, CA (US); Brian Jay Thomas, Palo Alto, CA (US); Daniel Gregory Muriello, Menlo Park, CA (US); Emily Grace Albert, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 506 days.

(21) Appl. No.: 15/199,295

(22) Filed: Jun. 30, 2016

(51) Int. Cl.
| | |
|---|---|
| *H04L 9/32* | (2006.01) |
| *G06F 21/62* | (2013.01) |
| *H04L 12/24* | (2006.01) |
| *H04L 29/08* | (2006.01) |
| *H04W 8/16* | (2009.01) |
| *H04W 12/02* | (2009.01) |

(52) U.S. Cl.
CPC ............ *H04L 41/082* (2013.01); *H04L 67/02* (2013.01); *H04L 67/306* (2013.01); *H04W 8/16* (2013.01); *H04W 12/02* (2013.01)

(58) Field of Classification Search
CPC ..... H04L 41/082; H04L 67/02; H04L 67/306; H04W 12/02; H04W 8/16
See application file for complete search history.

(56) References Cited

U.S. PATENT DOCUMENTS

| | | |
|---|---|---|
| 6,539,232 B2 | 3/2003 | Hendrey |
| 6,957,184 B2 | 10/2005 | Schmid |
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Smit |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |

(Continued)

OTHER PUBLICATIONS

TechCrunch, "Facebook Debuts the Digital Breakup With New Tools for Former Flames," https://techcrunch.com/2015/11/19/facebook-debuts-the-digital-breakup-with-new-tools-for-former-flames/#.xsikhb:mehB; 9 pgs, Nov. 19, 2015.

*Primary Examiner* — Soe Hlaing

(74) *Attorney, Agent, or Firm* — BakerHostetler

(57) ABSTRACT

In one embodiment, a method includes receiving an indication of a trigger action associated with a first user and with respect to a particular entity, sending to the first user a content-update interface for updating privacy settings associated with multiple content objects associated with the first user or the particular entity, receiving, from the first user via the content-update interface, settings updates for the content objects, and applying the settings updates to the privacy settings associated with the content objects.

21 Claims, 7 Drawing Sheets

(56) References Cited

U.S. PATENT DOCUMENTS

| | | | |
|---|---|---|---|
| 8,412,749 B2 | 4/2013 | Fortuna | |
| 8,538,960 B2 | 9/2013 | Wong | |
| 8,572,129 B1 | 10/2013 | Lee | |
| 8,595,297 B2 | 11/2013 | Marcucci | |
| 8,601,027 B2 | 12/2013 | Behforooz | |
| 8,732,208 B2 | 5/2014 | Lee | |
| 8,751,521 B2 | 6/2014 | Lee | |
| 8,782,080 B2 | 7/2014 | Lee | |
| 9,245,038 B2 | 1/2016 | Lee | |
| 2002/0196273 A1 | 12/2002 | Krause | |
| 2003/0154194 A1 | 8/2003 | Jonas | |
| 2003/0208474 A1 | 11/2003 | Soulanille | |
| 2004/0088325 A1 | 5/2004 | Elder | |
| 2004/0255237 A1 | 12/2004 | Tong | |
| 2005/0131872 A1 | 6/2005 | Calbucci | |
| 2005/0171955 A1 | 8/2005 | Hull | |
| 2006/0136419 A1 | 6/2006 | Brydon | |
| 2007/0094230 A1 | 4/2007 | Subramaniam | |
| 2007/0174304 A1 | 7/2007 | Shrufi | |
| 2007/0277100 A1 | 11/2007 | Sheha | |
| 2008/0046976 A1* | 2/2008 | Zuckerberg | H04L 63/102 726/4 |
| 2008/0270615 A1 | 10/2008 | Centola | |
| 2009/0006543 A1 | 1/2009 | Smit | |
| 2009/0106822 A1 | 4/2009 | Obasanjo | |
| 2009/0164929 A1 | 6/2009 | Chen | |
| 2009/0197681 A1 | 8/2009 | Krishnamoorthy | |
| 2009/0228296 A1 | 9/2009 | Ismalon | |
| 2009/0265319 A1 | 10/2009 | Lehrman | |
| 2009/0265326 A1 | 10/2009 | Lehrman | |
| 2009/0281988 A1 | 11/2009 | Yoo | |
| 2009/0287682 A1 | 11/2009 | Fujioka | |
| 2009/0299963 A1 | 12/2009 | Pippori | |
| 2010/0235354 A1 | 9/2010 | Gargaro | |
| 2010/0257577 A1* | 10/2010 | Grandison | G06F 21/6245 726/1 |
| 2011/0078166 A1 | 3/2011 | Oliver | |
| 2011/0087534 A1 | 4/2011 | Strebinger | |
| 2011/0087968 A1 | 4/2011 | Lakshmanan | |
| 2011/0196855 A1 | 8/2011 | Wable | |
| 2011/0231296 A1 | 9/2011 | Gross | |
| 2011/0289063 A1 | 11/2011 | Radlinski | |
| 2012/0011111 A1 | 1/2012 | Ahn | |
| 2012/0059708 A1 | 3/2012 | Galas | |
| 2012/0102404 A1 | 4/2012 | Tiu, Jr. | |
| 2012/0136852 A1 | 5/2012 | Geller | |
| 2012/0143921 A1 | 6/2012 | Wilson | |
| 2012/0166432 A1 | 6/2012 | Tseng | |
| 2012/0166433 A1 | 6/2012 | Tseng | |
| 2012/0179637 A1 | 7/2012 | Juan | |
| 2012/0185486 A1 | 7/2012 | Voigt | |
| 2012/0221581 A1 | 8/2012 | Narayanan | |
| 2012/0271831 A1 | 10/2012 | Narayanan | |
| 2012/0278127 A1 | 11/2012 | Kirakosyan | |
| 2012/0284329 A1 | 11/2012 | van den Oord | |
| 2012/0290562 A1 | 11/2012 | Wable | |
| 2012/0297017 A1 | 11/2012 | Livshits | |
| 2012/0311034 A1 | 12/2012 | Goldband | |
| 2012/0317088 A1 | 12/2012 | Pantel | |
| 2012/0331568 A1* | 12/2012 | Weinstein | H04L 12/185 726/29 |
| 2013/0007124 A1 | 1/2013 | Sweeney | |
| 2013/0019319 A1* | 1/2013 | Pearlman | H04L 63/104 726/27 |
| 2013/0031106 A1 | 1/2013 | Schechter | |
| 2013/0036109 A1 | 2/2013 | Kulick | |
| 2013/0041876 A1 | 2/2013 | Dow | |
| 2013/0066876 A1 | 3/2013 | Raskino | |
| 2013/0086057 A1 | 4/2013 | Harrington | |
| 2013/0103765 A1 | 4/2013 | Papakipos | |
| 2013/0124538 A1* | 5/2013 | Lee | G06F 17/3053 707/749 |
| 2013/0124542 A1 | 5/2013 | Lee | |
| 2013/0144899 A1 | 6/2013 | Lee | |
| 2013/0166601 A1 | 6/2013 | Chrapko | |
| 2013/0191372 A1 | 7/2013 | Lee | |
| 2013/0191416 A1 | 7/2013 | Lee | |
| 2013/0246404 A1 | 9/2013 | Kassem | |
| 2014/0024702 A1 | 1/2014 | Curtiss | |
| 2014/0040300 A1 | 2/2014 | Narayanan | |
| 2014/0089306 A1* | 3/2014 | Rana | G06F 17/30554 707/731 |
| 2014/0222807 A1 | 8/2014 | Lee | |
| 2014/0222835 A1 | 8/2014 | Lee | |
| 2014/0222854 A1 | 8/2014 | Lee | |
| 2015/0006566 A1 | 1/2015 | Lee | |
| 2015/0013016 A1* | 1/2015 | Kanter | G06F 21/6245 726/28 |
| 2015/0081686 A1 | 3/2015 | Lee | |
| 2015/0161290 A1 | 6/2015 | Narayanan | |
| 2016/0212230 A1* | 7/2016 | Schneider | H04L 67/22 |
| 2017/0004179 A1* | 1/2017 | Sang | G06F 17/30528 |
| 2017/0012913 A1* | 1/2017 | Lohani | H04L 67/306 |

* cited by examiner

MANAGING PRIVACY SETTINGS FOR CONTENT ON ONLINE SOCIAL NETWORKS

TECHNICAL FIELD

This disclosure generally relates to social graphs and managing privacy settings within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a first user of an online social network may be allowed to control the visibility of a content object with respect to one or more entities by changing one or more privacy settings or tags associated with the content object. The first user may be motivated (e.g., by particular life events) to change such visibility of a large number of content objects, which may be costly in terms of time and efforts if the first user only has the ability to make changes to individual content objects. In particular embodiments, the social-networking system may determine, based on a trigger action, that the first user may want to change or update the visibility of one or more content objects associated with the first user and, based on the determination, may prompt the first user to enter a content-update workflow. The content-update workflow may provide the first user an interface for systematically and efficiently controlling such visibility in ways customizable to fit the first user's specific goals.

In particular embodiments, the trigger action may be any suitable action on the online social network indicating that changes may need to be made to the visibility of one or more content objects with respect to the first user, a particular entity associated with the trigger action, or one or more third-party entities. For example, a first user of the online social network may have recently ended a romantic relationship with a second user. Her editing a relationship status from "in a relationship with the second user" to "single" on her profile interface may constitute a trigger action, suggesting a need for making settings updates. In response to the trigger action, the social-networking system may redirect, contingent on appropriate permissions, the first user to a workflow process (i.e., the content-update workflow) for editing privacy and content settings with respect to the particular entity. The privacy and content settings may comprise privacy settings for one or more content objects, settings associated with one or more affinity coefficients, one or more content filters, one or more tags on one or more content objects, other suitable settings, or any combination thereof. A user interface ("a content-update interface") corresponding to the content-update workflow may be provided to the first user. In the content-update interface, the first user may provide settings updates affecting, for example, the visibility of content objects posted by the particular entity with respect to the first user, the visibility of content objects posted by the first user with respect to the particular entity, the visibility of content objects associated with the first user with respect to third-party entities, or any combination thereof. Continuing the preceding example, after ending the romantic relationship with the second user, the first user may desire to reduce her contacts with the second user on the online social network. The first user may thereby provide settings updates in the content-update interface such that (1) the first user will see less content objects associated with the second user, (2) the second user is allowed to see less content objects associated with the first user, or (3) third-party users are allowed to see less content objects tagging both the first user and the second user. The social-networking system may apply the settings updates to all affected content objects collectively, while allowing the first user to customize settings updates for particular content objects. As implemented by the social-networking system, the content-update workflow may allow the first user to achieve her goal of reducing contacts with the second user, while in the meantime, may preserve a connection between the first user and the second user on the online social network and avoid notifying the second user about the first user's actions.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
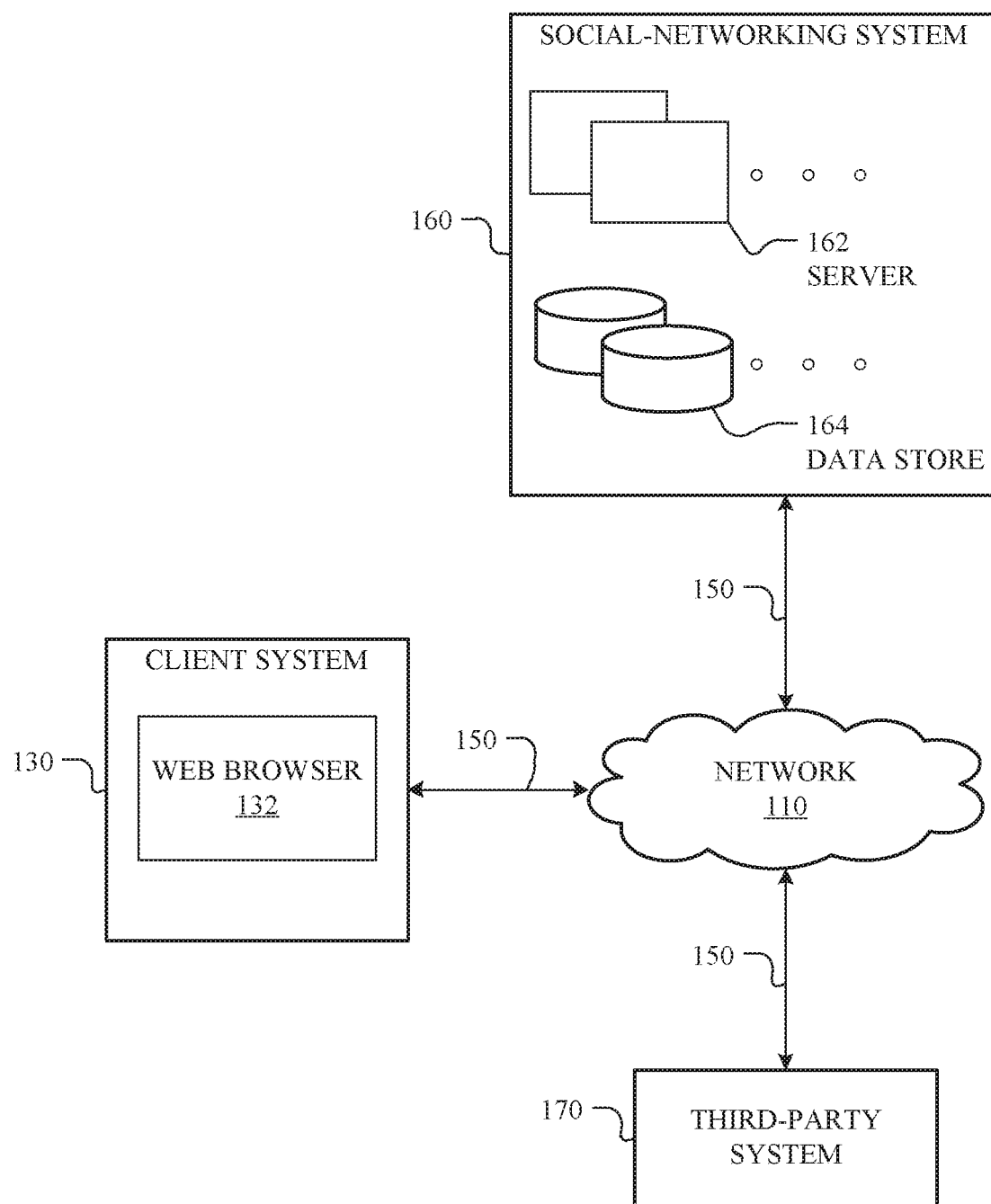
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
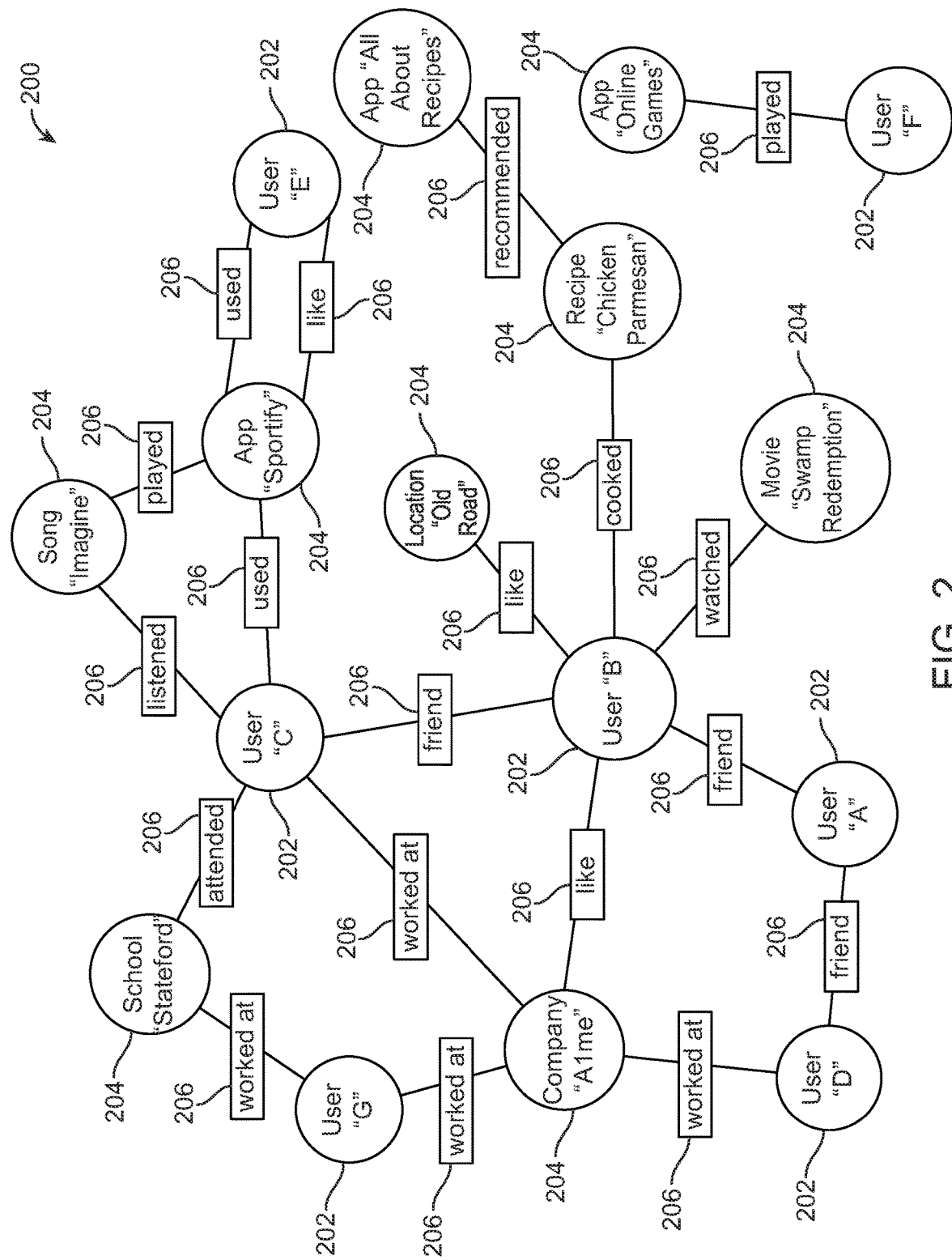
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204).

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photos albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 204 corresponding to a particular photo may have a privacy setting specifying that the photo may be accessed only by users tagged in the photo and the tagged user's friends. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 200. A privacy setting may be specified for one or more edges 206 or edge-types of social graph 200, or with respect to one or more nodes 202, 204 or node-types of social graph 200. The privacy settings applied to a particular edge 206 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 204 connected to a user node 202 of the first user by an edge 206. The first user may specify privacy settings that apply to a particular edge 206 connecting to the concept node 204 of the object, or may specify privacy settings that apply to all edges 206 connecting to the concept node 204. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

Privacy settings associated with an object may specify any suitable granularity of permitted access or denial of access. As an example and not by way of limitation, access or denial of access may be specified for particular users (e.g., only me, my roommates, my boss), users within a particular degrees-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. In particular embodiments, access or denial of access may be specified by time or date. As an example and not by way of limitation, a user may specify that a particular image uploaded by the user is visible to the user's friends for the next week. As another example and not by way of limitation, a company may post content related to a product release ahead of the official launch, and specify that the content may not be visible to other users until after the product launch. In particular embodiments, access or denial of access may be specified by geographic location. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from be sent to the user. In the search-query context, an object may be provided as a search result only if the querying user is authorized to access the object, e.g., the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on an online social network, or other computing system As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users that attend the same university as the first user may view the first user's pictures, but that other users that are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 160 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 160 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, privacy settings may allow a user to specify whether particular applications or processes may access, store, or use particular objects or information associated with the user. The privacy settings may allow users to opt in or opt out of having objects or information accessed, stored, or used by specific applications or processes. The social-networking system 160 may access such information in order to provide a particular function or service to the user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160. As another example and not by way of limitation, social-networking system 160 may have functionalities that may use as inputs personal or biometric information of the user. A user may opt to make use of these functionalities to enhance their experience on the online social network. As an example and not by way of limitation, a user may provide personal or biometric information to the social-networking system 160. The user's privacy settings may specify that such information may be used only for particular processes, such as authentication, and further specify that such information may not be shared with any third-party system 170 or used for other processes or applications associated with the social-networking system 160. As yet another example and not by way of limitation, an online social network may provide functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to send voice messages, to improve voice recognition in order to use voice-operated features of the online social network), and further specify that such voice recording may not be shared with any third-party system 170 or used by other processes or applications associated with the social-networking system 160.

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 160 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, social-networking system 160 may use a user's previous activities and calculated moods or sentiments to determine a present mood or sentiment. A user who wishes to enable this functionality may indicate in their privacy settings that they opt in to social-networking system 160 receiving the inputs necessary to determine the mood or sentiment. As an example and not by way of limitation, social-networking system 160 may determine that a default privacy setting is to not receive any information necessary for determining mood or sentiment until there is an express indication from a user that social-networking system 160 may do so. In particular embodiments, social-networking system 160 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, social-networking system 160 may use the user's mood or sentiment to provide newsfeed items, pages, friends, or advertisements to a user. The user may specify in their privacy settings that social-networking system 160 may determine the user's mood or sentiment. The user may then be asked to provide additional privacy settings to indicate the purposes for which the user's mood or sentiment may be used. The user may indicate that social-networking system 160 may use his or her mood or sentiment to provide newsfeed content and recommend pages, but not for recommending friends or advertisements. Social-networking system 160 may then only provide newsfeed content or pages based on user mood or sentiment, and may not use that information for any other purpose, even if not expressly prohibited by the privacy settings.

In particular embodiments, the social-networking system 160 may temporarily access, store, or use particular objects or information associated with a user in order to facilitate particular actions of the first user, and may subsequently delete the objects or information. As an example and not by way of limitation, a first user may transmit a message to a second user, and the social-networking system 160 may temporarily store the message in a data store 164 until the second user has view or downloaded the message, at which point the social-networking system 160 may delete the message from the data store 164. As another example and not by way of limitation, continuing with the prior example, the message may be stored for a specified period of time (e.g., 2 weeks), after which point the social-networking system 160 may delete the message from the data store 164. In particular embodiments, a user may specify whether particular types of objects or information associated with the user may be accessed, stored, or used by the social-networking system 160. As an example and not by way of limitation, a user may specify that images sent by the user through the social-networking system 160 may not be stored by the social-networking system 160. As another example and not by way of limitation, a first user may specify that messages sent from the first user to a particular second user may not be stored by the social-networking system 160. As yet another example and not by way of limitation, a user may specify that all objects sent via a particular application may be saved by the social-networking system 160.

In particular embodiments, privacy settings may allow a user to specify whether particular objects or information associated with the user may be accessed from particular client systems 130 or third-party systems 170. The privacy settings may allow users to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the user may be prompted to specify a particular privacy setting for each context. As an example and not by way of limitation, a user may utilize a location-services feature of the social-networking system 160 to provide recommendations for restaurants or other places in proximity to the user. The user's default privacy settings may specify that the social-networking system 160 may use location information provided from a client device 130 of the user to provide the location-based services, but that the social-networking system 160 may not store the location information of the user or provide it to any third-party system 170. The user may then update the privacy settings to allow location information to be used by a third-party image-sharing application in order to geo-tag photos.

In particular embodiments, the social-networking system 160 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 160 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing particular privacy setting, a prompt may be presented to the user to remind the user of his or her current privacy settings and asking the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 160 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 160 may prompt the user with a reminder of that the user's current privacy settings of being visible only to friends, and a warning that this change will make all of the users past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 160 may send a reminder to the user to confirm his or her privacy settings every six months or after every ten photo posts. In particular embodiments, privacy settings may also allow users to control access to the objects or information on a per-request basis. As an example and not by way of limitation, the social-networking system 160 may notify the user whenever a third-party system 170 attempts to access information associated with the user, and require the user to provide verification that access should be allowed before proceeding.

Managing Privacy and Content Settings

In particular embodiments, the social-networking system 160 may determine, based on a trigger action, that a first user of an online social network may want to change or update the visibility of one or more content objects associated with the first user and, based on the determination, may prompt the first user to provide updated privacy and content settings regarding the visibility of the content objects. The trigger action may be any suitable action on the online social network indicating that changes may need to be made to the visibility of one or more content objects with respect to one or more of the first user, a particular entity associated with the trigger action, one or more third-party entities, or another suitable entity. In response to the trigger action, the social-networking system 160 may redirect the first user to a workflow process ("a content-update workflow") for editing privacy and content settings with respect to the particular entity. The privacy and content settings may comprise privacy settings for one or more content objects, settings associated with one or more affinity coefficients, one or more content filters, one or more tags on one or more content objects, other suitable settings, or any combination thereof. The privacy and content settings associated with the first user may only be changed in response to an explicit input from the first user, and may not be changed without the approval of the first user. A user interface ("a content-update interface") corresponding to the content-update workflow may be provided to the first user. The content-update workflow may comprise providing the first user with the current privacy and content settings with respect to the particular entity, receiving one or more updates to the privacy and content settings from the first user, and applying the settings updates to corresponding privacy and content settings. The social-networking system 160 may then apply the settings updates without informing or requesting the consent of any entity other than the first user (alternatively, particular updates may require consent of both the first user and one or more other entities). The particular entity associated with the trigger action or a third-party entity may be a user, a group of users, an organization, a place, a website, or anything appropriate, which is capable of being represented in the social-networking system 160 or a third-party system 170, which is separate from the social-networking system 160 and coupled to the social-networking system 160 via a network 110. As an example and not by way of limitation, a first user of the online social network may have recently ended a romantic relationship with a second user and may have edited a relationship status from "in a relationship with the second user" to "single." The social-networking system 160 may recognize the first user's action of editing a relationship status as a trigger action suggesting a need to update privacy and content settings and provide the content-update interface to the first user. In the content-update interface, the first user may provide settings updates regarding content objects associated with the first user or the second user such that, on the online social network, (1) the first user will see less content objects associated with the second user, (2) the second user is allowed to see less content objects associated with the first user, or (3) third-party users are allowed to see less content objects associated with both the first user and the second user. The changes may take place without the knowledge of the second user (alternatively, particular updates may require the second user to be informed of the update). As another example and not by way of limitation, a first user may be friends with a second user. After an argument between the first user and the second user, the first user may desire to distance herself from the second user on the online social network. The first user may do so by, for example, un-tagging herself from photographs in which both the first user and the second user are currently tagged. The social-networking system 160 may recognize the first user's action of un-tagging herself from a certain number of photographs showing the second user as a trigger action. The first user may then be prompted to enter the content-update interface and be allowed to update privacy and content settings in a manner similar to the preceding example. Although this disclosure describes prompting a user to edit privacy and content settings in response to a trigger action in a particular manner, this disclosure contemplates prompting a user to edit privacy and content settings in response to a trigger action in any suitable manner.

In particular embodiments, the social-networking system 160 may receive an indication of a trigger action associated with a first user of an online social network, wherein the trigger action is with respect to a particular entity (e.g., a second user) of the online social network. The social-networking system 160 may provide users with the ability to take actions on various types of items or objects, supported by the social-networking system 160. The trigger action may be any suitable action on the online social network. As an example and not by way of limitation, a first user selecting to unfollow a second user's newsfeed may be such a trigger action. The social-networking system 160 may be configured to recognize one or more of a type of, a characteristic of, a repetition pattern of, or a relationship affected by an action as an indication of a trigger action. The social-networking system 160 may continuously or periodically monitor user activities to determine occurrences of trigger actions. In conjunction with receiving an indication of a trigger action, the social-networking system 160 may also receive or determine an identity of a user who takes the action and information associated with a particular entity of the online social network with respect to which the action is taken. The social-networking system 160 may determine that a trigger action has occurred based on either an explicit signal or an implicit signal from the first user. When the signal from the first user is implicit, the social-networking system 160 may require a subsequent explicit input from the first user as a precondition for initiating the content-update workflow.

In particular embodiments, the trigger action may be a request by the first user to access the content-update interface. As an example and not by way of limitation, the first user may interact with an interactive element associated with a user interface of the social-networking system 160 (e.g., by clicking on a button) to access the content-update interface. In the content-update interface, the first user may first be prompted to indicate one or more particular entities associated with the current action. Here, the first user's request to access the content-update interface (in particular, the type of this action) may provide the social-networking system 160 an explicit signal indicating that a trigger action has occurred.

In particular embodiments, the trigger action may be associated with a change in a relationship status of the first user. As an example and not by way of limitation, a first user may edit, on the online social network, a relationship status from "in a relationship with a second user" to "single." This action is with respect to the second user (i.e., the particular entity). The first user's action of changing a relationship status (in particular, the type of and the relationship affected by this action) may provide the social-networking system 160 an implicit signal that a trigger action has occurred. The social-networking system 160 may request the first user to grant explicit approval before providing the content-update interface to the first user.

In particular embodiments, the trigger action may be associated with updating one or more tags on one or more content objects. As an example and not by way of limitation, the first user may initially be tagged in a plurality of photographs that also tag a second user. The first user may un-tag herself from the photographs. Particularly, a count of photographs from which the first user un-tags herself may exceed a threshold value (e.g., 5). The social-networking system 160 may determine that the first user's action is with respect to the second user (i.e., the particular entity). The first user's repeated action of updating tags (in particular, the characteristics and repetition pattern of the actions) may provide the social-networking system 160 an implicit signal that a trigger action has occurred. The social-networking system 160 may request the first user to grant explicit approval before providing the content-update interface to the first user.

In particular embodiments, the trigger action may be associated with updating the privacy settings associated with a plurality of content objects. As an example and not by way of limitation, the first user may update privacy settings of one or more of her photographs by changing the visibility of the photographs so they are no longer visible to the second user. The social-networking system 160 may determine that this action is with respect to the second user (i.e., the particular entity). The first user's action of updating the privacy settings (in particular, the characteristics of the action) may provide the social-networking system 160 an implicit signal that a trigger action has occurred. The social-networking system 160 may request the first user to grant explicit approval before providing the content-update interface to the first user. Although this disclosure describes receiving an indication of a trigger action in a particular manner, this disclosure contemplates receiving an indication of a trigger action in any suitable manner.

In particular embodiments, the social-networking system 160 may send, to a client system 130 of the first user in response to receiving the indication of the trigger action, a content-update interface for updating privacy settings associated with a plurality of content objects associated with one or more of the first user or the particular entity, wherein the privacy settings for each content object define a visibility of the content object with respect to one or more entities. The content-update interface may provide various tools to assist a user in editing privacy and content settings. The content-update interface may display to the first user the current privacy and content settings of one or more content objects associated with one or more of the first user or the particular entity and prompt the first user to provide settings updates regarding the visibility of the content objects. The user may be allowed to do so by making one or more choices. A choice may affect the visibility of an individual content object or a plurality of content objects (i.e., an en masse update of a set of content objects). The privacy settings for each content object may specify how the content object (or particular information associated with the content object) can be accessed (e.g., viewed or shared) using the online social network. The privacy settings may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. The social-networking system 160 may provide a default privacy setting with respect to each type of content object and may allow a user to edit any or all of the privacy settings. Changes to privacy settings may take effect retroactively, affecting the visibility of content objects shared prior to the change. Besides privacy settings, affinity coefficients, content filters, or tags may also affect the visibility of content objects and be made available by the content-update interface for the first user to update. More information on the visibility of content objects on an online social network may be found in U.S. patent application Ser. No. 13/556,017, filed 23 Jul. 2012, and U.S. patent application Ser. No. 13/890,052, filed 8 May 2013, each of which is incorporated by reference. As an example and not by way of limitation, in response to a first user's trigger action of editing a relationship status from "in a relationship with a second user" to "single," the social-networking system 160 may send, to a client system 130 of the first user, a content-update interface. The content-update interface may provide the first user options including "keep current privacy settings" and "hide your posts from the second user." The first option may correspond to preserving current privacy settings for content objects associated with the first user. The second option may correspond to updating privacy settings for one or more content objects of the first user such that the second user is denied access. As another example and not by way of limitation, in response to a first user's trigger action of manually updating the privacy settings of the first user's photographs tagging a second user from being visible to the public to being visible to only those tagged in each photograph, the social-networking system 160 may send, to a client system 130 of the first user, a content-update interface. The content-update interface may provide the first user options including "keep all posts as they are," "edit individual posts," and "edit all my posts." The first option may correspond to preserving current privacy settings for content objects associated with the first user. The second option may correspond to providing the first user an interface for the first user to edit privacy settings of each of her content objects that are associated with the second user one-by-one. The third option may correspond to providing the first user an interface for the first user to provide settings updates that can be applied by the social-networking system 160 to all her content objects that are associated with the second user en masse.

In particular embodiments, the content-update interface may further allow the first user to update an affinity coefficient between the first user and the particular entity. As an example and not by way of limitation, in response to a first user's trigger action of editing a relationship status from "in a relationship with a second user" to "single," the social-networking system 160 may send, to a client system 130 of the first user, a content-update interface. The content-update interface may provide the first user options including "see the second user anywhere" and "limit where you see the second user." The first option may correspond to preserving a current affinity coefficient between the first user and the second user. The second option may correspond to reducing an affinity coefficient between the first user and the second user such that a content object associated with the second user is less likely to be presented to the first user.

In particular embodiments, the content-update interface may further allow the first user to create a content filter function for filtering one or more of the content objects presented to the first user. As an example and not by way of limitation, in addition to the options "see the second user anywhere" and "limit where you see the second user" as presented in the preceding example, the content-updating interface may further provide the first user an option "never see the second user." This additional option may correspond to applying a filter (or "blinder") to the interface module of the social-networking system 160 such that any content object posted by the second user or tagging the second user is filtered out and prevented from being displayed to the first user. Because a content filter may not affect a relationship or an affinity coefficient between the first user and the second user or affect the second user's ability to access content objects associated with the first user, it may be applied without knowledge of the second user. The filter may comprise one or more exceptions to handle situations such as when the first user visits a profile interface corresponding to the second user.

In particular embodiments, the content-update interface may further allow the first user to update one or more tags on one or more content objects, respectively, associated with one or more of the first user or the particular entity. As an example and not by way of limitation, in response to a first user's trigger action of repetitively un-tagging herself from photographs also tagging a second user, the social-networking system 160 may send, to a client system 130 of the first user, a content-update interface. The content-update interface may provide the first user an option "edit all posts that I'm tagged in." This option may correspond to providing the first user an interface allowing the first user to un-tag herself from content objects associated with the second user en masse. Although this disclosure describes sending a content-update interface to the first user in a particular manner, this disclosure contemplates sending a content-update interface to the first user in any suitable manner.

In particular embodiments, the social-networking system 160 may receive, from the client system 130 of the first user via the content-update interface, one or more settings updates for one or more content objects of the plurality of content objects. The content-update interface made available to the first user may receive and record one or more inputs by the first user. The workflow corresponding to the content-update interface may comprise identifying one or more settings updates for one or more content objects based on the first user's inputs and cause the settings updates to be sent to the social-networking system 160. Alternatively, identifying one or more settings updates based on the first user's inputs may be performed server-side at the social-networking system 160. As an example and not by way of limitation, the content-update interface may receive, from a first user, a selection of the option "edit all my posts" and provide the first user an interface for making en masse updates. The first user may provide one or more subsequent inputs corresponding to minimizing publicity of all the first user's content objects that are associated with a second user. It may be determined, based on the inputs, that privacy settings should be updated such that access to each of such content objects is limited to only those tagged in the object. A client system 130 of the first user may then send to the social-networking system 160, via the content-update interface, one or more corresponding settings updates. As another example and not by way of limitation, the content-update interface may receive, from a first user, a selection of the option "edit all posts that I'm tagged in" and provide the first user an interface for un-tagging herself from content objects. The first user may provide one or more subsequent inputs corresponding to un-tagging herself from all of a second user's content objects. It may be determined, based on the inputs, that one or more settings updates should be applied to such content objects to remove tags corresponding to the first user. A client system 130 of the first user may then send the settings updates to the social-networking system 160, via the content-update interface.

In particular embodiments, the social-networking system 160 may receive settings updates for content objects associated with the first user and update privacy settings for the content objects associated with the first user to have a visibility that is not visible to the particular entity. As an example and not by way of limitation, the content-update interface may receive a selection of the option "hide your posts from a second user" from a first user. Accordingly, a client system 130 of the first user may send, via the content-update interface, one or more settings updates to the social-networking system 160. The social-networking system 160 may apply the settings updates to each of the first user's content objects by adding the second user to a "blocked list" associated with the content object, containing users that are specifically denied access to the content object. Each of the content objects will then have a visibility that is not visible to the second user. In particular embodiments, updating privacy settings for the content objects may be reversible. Continuing the preceding example, the first user may later change her mind and input, through the content-update interface, a selection of the option "stop hiding your posts from the second user." The social-networking system 160 may, upon receiving settings updates corresponding to this new input, remove the second user from the blocked lists, thereby reversing the effects of the prior settings updates.

In particular embodiments, the social-networking system 160 may receive a settings update changing the affinity coefficient between the first user and the particular entity to a baseline level. As an example and not by way of limitation, the content-update interface may receive a selection of the option "limit where you see a second user" from a first user. Accordingly, a client system 130 of the first user may send to the social-networking system 160, via the content-update interface, one or more settings updates changing an affinity coefficient between the first user and the second user to a baseline level (e.g., 0). An affinity coefficient may be used by the social-networking system 160 in generating or presenting content objects to a user and in ranking or ordering the content objects to be presented (e.g., threshold affinity coefficients may be required for particular activities). Changing the affinity coefficient between the first user and the second user to a baseline level (e.g., a level associated with no relationship) may essentially reset the relationship between users within the context of the online social network. Subsequently, given this low affinity coefficient, it is unlikely that a content object associated with the second user will be presented to the first user. Furthermore, updating the affinity coefficient may also make it unlikely that the first user will be prompted to interact with the second user (e.g., suggesting for tagging the second user). In particular embodiments, changing the affinity coefficient to a baseline level may be reversible. Continuing the preceding example, before updating an affinity coefficient between the first user and the second user, the social-networking system 160 may store an original affinity coefficient in a data store 164. The first user may later change her mind and input, through the content-update interface, a selection of the option "see the second user anywhere" to replace the prior option "limit where you see the second user." The social-networking system 160 may, upon receiving settings updates corresponding to this new input, retrieve and reinstate the stored original affinity coefficient, thereby reversing the effects of the prior settings updates. The reinstated original affinity coefficient may enable the social-networking system 160 to present content objects associated with the second user to the first user and to prompt the first user to interact with the second user.

In particular embodiments, the social-networking system 160 may implement one or more functionalities with the goal of making it more difficult for the first user to cancel or reverse settings updates. Such functionalities may be used to address the first user's particular self-disciplinary needs. They may be presented as optional to the first user via the content-update interface and be enabled or disabled based on the first user's inputs. As an example and not by way of limitation, the social-networking system 160 may cause the content-update interface to be locked or disabled for a time period of a first user's choice. During the time period, the first user may not be able to update privacy and content settings through the content-update interface. As another example and not by way of limitation, the content-update interface may be configured to display a customizable automatic message (e.g., emphasizing a first user's accomplishment of not interacting with a second user) whenever the first user accesses the content-update interface. As another example and not by way of limitation, the content-update interface may present a customizable task to a first user (e.g., a mathematics problem), completion of which is required for modifying particular privacy and content settings. As yet another example and not by way of limitation, the social-networking system 160 may send an automatic notification or request for permission to a particular friend of a first user whenever the first user attempts to modify particular privacy and content settings.

In particular embodiments, the social-networking system 160 may update one or more default privacy settings for a content-posting interface based on received settings updates. The social-networking system 160 may assign default privacy settings to each content object as a user posts the content object via the content-posting interface. The default privacy settings may be determined based on a type of the content object. For example, all photographs posted by a particular user may be set to be accessible to the public by default. As an example and not by way of limitation, a first user may provide one or more settings updates to the social-networking system 160 denying a second user access to one or more of the first user's content objects. Accordingly, the social-networking system 160 may update default privacy settings for all content objects subsequently posted by the first user to not be accessible to the second user. This may be achieved by automatically adding the second user to a blocked list whenever the first user posts a content object on the online social network. Although this disclosure describes receiving one or more settings updates for one or more content objects in a particular manner, this disclosure contemplates receiving one or more settings updates for one or more content objects in any suitable manner.

In particular embodiments, the social-networking system 160 may apply the settings updates to the privacy settings associated with the respective one or more content objects.

Privacy and content settings may be stored in one or more data stores 164 and in association with one or more content objects or one or more entities of the online social network. The social-networking system 160 may apply settings updates by modifying one or more stored privacy and content settings individually or, alternatively, by modifying the settings collectively or in a rule-based manner. The social-networking system 160 may be configured to apply settings updates retrospectively, affecting the visibility of one or more content objects posted in the past, or prospectively, affecting content objects to be posted that fit a particular description. Privacy and content settings may be applied by modifying one or more nodes or edges 206 in the social graph 200. As an example and not by way of limitation, the content-update interface may receive, from a first user, a selection of the option "edit individual posts" and provide the first user an interface for making updates to privacy settings of individual content objects. The first user may provide one or more subsequent inputs corresponding to denying a second user access to one of the first user's posts. Based on the first user's inputs, the social-networking system 160 may identify privacy settings stored in association with the post and add the second user to a blocked list that is part of the identified privacy settings. As another example and not by way of limitation, the content-update interface may receive, from a first user, a selection of the option "edit all my posts" and provide the first user an interface for making en masse updates to all content objects of the first user. The first user may provide one or more subsequent inputs corresponding to denying a second user access to all posts of the first user. Based on the first user's inputs, the social-networking system 160 may identify privacy settings stored in association with all posts of the first user and add the second user to a blocked list associated with each post. Furthermore, whenever the first user has a new post on the online social network, the social-networking system 160 may automatically apply similar settings updates such that the new post is invisible to the second user. In particular embodiments, applying the settings updates may comprise updating privacy settings for the content objects posted by the first user to have a visibility that is not visible to all entities except the particular entity. Continuing the preceding example, based on different inputs by the first user, the social-networking system 160 may modify privacy settings of all posts of the first user by specifying that access is only granted to the first user and the second user.

In particular embodiments, applying the settings updates may comprise updating privacy settings for each content object posted by the particular entity to have a visibility that is not visible to the first user. Particular embodiments of the social-networking system 160 may grant each user limited authority in editing privacy settings of content objects posted by other users. For example, such authority may be limited to controlling the content object's visibility to the user herself. As an example and not by way of limitation, based on received settings updates, the social-networking system 160 may identify stored privacy settings associated with each content object posted by a second user (i.e., the particular entity) and add a first user to a blocked list associated with the content object.

In particular embodiments, applying the settings updates may comprise deleting each tag of the first user on each content object posted by the particular entity in which the first user is tagged. As an example and not by way of limitation, based on received settings updates, the social-networking system 160 may identify one or more content objects posted by a second user (i.e., the particular entity) tagging a first user and remove a tag representing the first user from each identified content object. Furthermore, the social-networking system 160 may automatically block any tagging request from being sent to the first user if the tagging request is with respect to a content object posted by the second user.

In particular embodiments, applying the settings updates may comprise deleting each tag of the first user on each content object posted by an entity other than the particular entity in which the first user is tagged. As an example and not by way of limitation, based on received settings updates, the social-networking system 160 may identify one or more content objects posted by an entity other than a second user (i.e., the particular entity) tagging a first user and remove a tag representing the first user from each identified content object. Furthermore, the social-networking system 160 may automatically block any tagging request from being sent to the first user unless the tagging request is with respect to a content object posted by the second user. Although this disclosure describes applying the settings updates to the privacy settings in a particular manner, this disclosure contemplates applying the settings updates to the privacy settings in any suitable manner.

Figure 3:
FIG. 3 illustrates an example user interface prompting a user to enter a content-update workflow.

FIG. 3 illustrates an example user interface prompting a user to enter a content-update workflow. In particular embodiments, after receiving an indication of a trigger action associated with a first user, the social-networking system 160 may prompt the first user to enter a content-update workflow for editing privacy and content settings. The trigger action may be any suitable action on the online social network indicating that changes may need to be made to the visibility of one or more content objects with respect to one or more of the first user, a particular entity associated with the trigger action, one or more third-party entities, or another suitable entity. An example trigger action may be an explicit request to access a content-update interface, changing a relationship status, unfollowing a newsfeed associated with a particular entity, updating one or more tags on one or more content objects, updating privacy settings associated with one or more content objects, another suitable action, or any combination thereof. As illustrated by FIG. 3, the social-networking system 160 may provide a first user an "Edit Profile" interface 300 for the first user to edit information included in the first user's profile. In a particular use scenario, the first user may change, in a relationship status field 310, a relationship of the first user from "in a relationship with Taylor" to "single." The social-networking system 160 may recognize this action of the first user as a trigger action. Before initiating the content-update workflow in response to the trigger action, the social-networking system 160 may display a pop-up message field 320 requesting the first user's approval. The pop-up message field 320 may contain a passage suggesting actions that the first users may take and provide the first user choices of "maybe later" and "get started." If the first user clicks on the "get started" button, the social-networking system 160 may initiate the content-update workflow and redirect the first user to a content-update interface. Otherwise, the social-networking system 160 may continue displaying the current interface to the first user. Although FIG. 3 illustrates receiving indication of a particular trigger action and prompting a user to enter a content-update workflow in a particular manner, this disclosure contemplates receiving indication of any suitable trigger action and prompting a user to enter a content-update workflow in any suitable manner.

Figure 4:
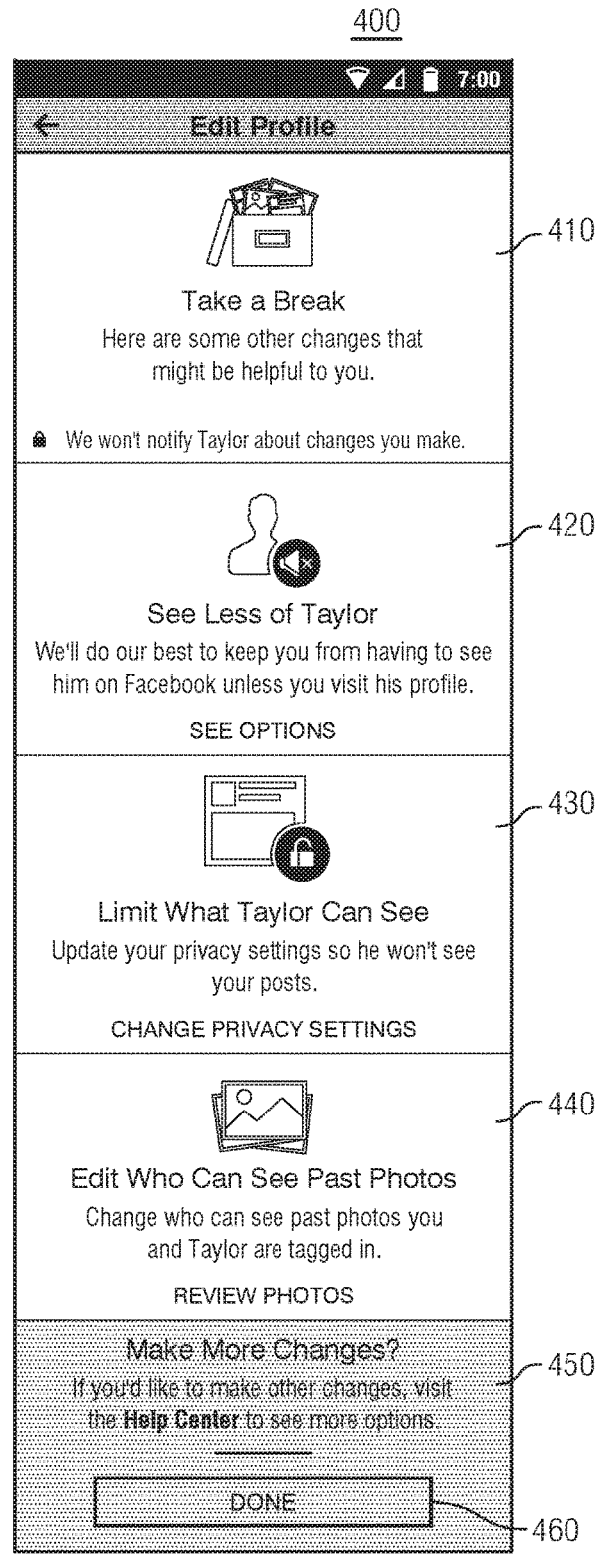
FIG. 4 illustrates an example summary page of an example content-update interface.

FIG. 4 illustrates an example summary page of an example content-update interface. The social-networking system 160 may begin the content-update workflow by redirecting the first user to a summary page 400 of the content-update interface. The summary page 400 may provide the first user an overview of changes that the first user is able to make through the content-update interface. It may comprise a heading section 410 that briefly summarizes the purpose of the content-update interface and assures the first user that the particular entity with respect to which the trigger action was taken (i.e., Taylor) will not be notified about changes made by the first user. The summary page 400 may further comprise a section 420 corresponding to the functionality of allowing the first user to see less of the particular entity, a section 430 corresponding to the functionality of allowing the first user to limit what content objects of the first user the particular entity may access, and a section 440 corresponding to the functionality of allowing the first user to control who may see content objects tagging both the first user and the particular entity. Each of sections 420, 430, and 440 may comprise a brief summary of its corresponding functionality and an interactive element (i.e., "see options," "change privacy settings," or "review photos"). By clicking on one of the interactive elements, the first user may be redirected to an "update page" 500, 600, or 700 corresponding to the particular interactive element. In addition to the three main types of settings updates that the first user may provide through sections 420, 430, and 440, the summary page may further comprise a section 450 suggesting the first user to explore further options at a "help center" interface. If the first user would not like to provide any more settings updates, the first user may click on the "done" button 460 at the bottom of the summary page 400 to exit the content-update interface. Although FIG. 4 illustrates providing a content update overview in a particular manner, this disclosure contemplates providing a content update overview in any suitable manner.

Figures 5, 6:
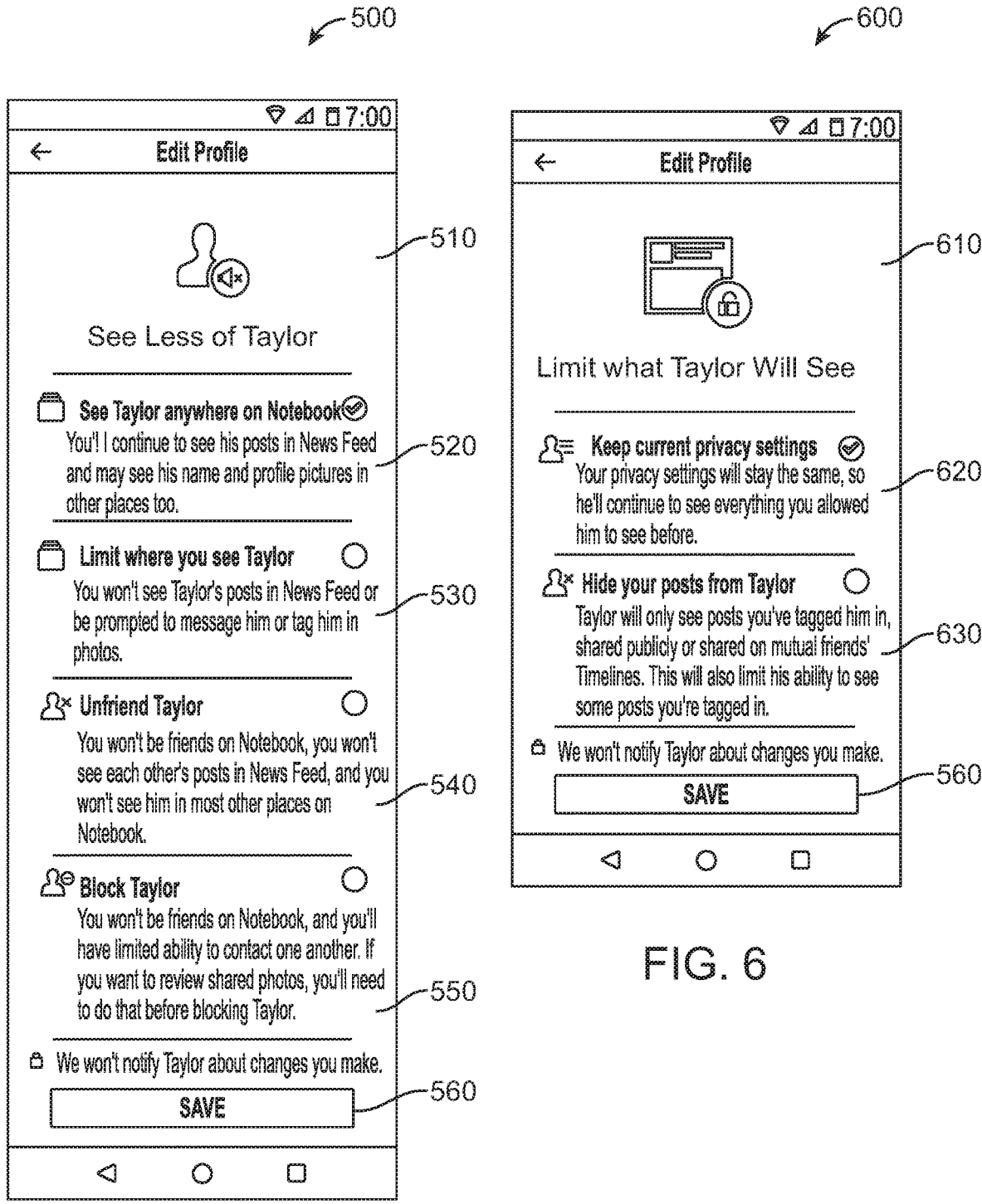
FIG. 5 illustrates an example update page of an example content-update interface allowing a first user to update privacy and content settings in order to see less of a particular entity.
FIG. 6 illustrates an example update page of an example content-update interface allowing a first user to update privacy and content settings in order to limit the visibility of the first user's content objects to a particular entity.

FIG. 5 illustrates an example update page of an example content-update interface allowing a first user to update privacy and content settings in order to see less of a particular entity. If the first user clicks on the interactive element in section 420 of the summary page 400, the social-networking system 160 may redirect the first user to update page 500 of the content-update interface. In update page 500, the first user may provide one or more settings updates affecting how the social-networking system 160 presents content objects associated with the particular entity, with respect to which the first user took the trigger action, to the first user. In the current use scenario, the first user may desire to see fewer content objects associated with Taylor on the online social network. The update page 500 may comprise a heading section 510 indicating the main function of the current interface. It may further comprise four options 520, 530, 540, and 550 corresponding to different applicable settings updates, each option comprising a title and a brief description of its effects. Option 520 may be marked with a checkmark to indicate that option 520 corresponds to the current or default privacy and content settings. If the first user takes no action in the current update page 500, option 520 "see Taylor anywhere on Facebook" may remain active. The social-networking system 160 may preserve the current privacy and content settings applicable to content objects associated with Taylor. The first user may continue to see the content objects as before.

If the first user clicks to select option 530 "limit where you see Taylor," settings updates may be applied such that the first user will not see Taylor's posts in News Feed or be prompted to message him or tag him in photos. This change may be achieved by one of three alternative methods. First, the social-networking system 160 may change an affinity coefficient between the first user and Taylor to a baseline level. Given this new low affinity coefficient, it is unlikely that a content object associated with Taylor will be presented to the first user. Furthermore, updating the affinity coefficient may also make it unlikely that the first user will be prompted to interact with Taylor (e.g., suggesting for tagging Taylor). However, after the affinity coefficient has been changed, the first user may still see content objects associated with Taylor in particular situations. For example, the first user may still be presented a photograph tagging multiple individuals including Taylor when one of the individuals has a high affinity coefficient with the first user. The social-networking system 160 may provide the first user an option to reverse this change, via the content-update interface, by reinstating the original affinity coefficient between the first user and Taylor without notifying Taylor. Second, a content filter may be applied to the interface module of the social-networking system 160 such that any content object posted by Taylor or tagging Taylor is prevented from being displayed to the first user. In comparison with the first method, this method may more thoroughly prevent content objects associated with Taylor from being viewed or accessed by the first user. The social-networking system 160 may provide the first user an option to reverse this change, via the content-update interface, by removing or disabling the content filter without notifying Taylor. Third, the social-networking system 160 may update privacy settings for each content object posted by Taylor or tagging Taylor to have a visibility that is not visible to the first user. If this method is used, content objects associated with Taylor not only will not be presented to the first user (e.g., in the first user's newsfeed) but also will be made entirely inaccessible to the first user (e.g., the first user will be unable to search for, access, or view Taylor's content). The social-networking system 160 may provide the first user an option to reverse this change, via the content-update interface, by resetting related privacy settings without notifying Taylor.

If the first user clicks to select option 540 "unfriend Taylor," the social-networking system 160 may remove a friend-type edge corresponding to a friend relation between a user node 202 corresponding to the first user and a user node 202 corresponding to Taylor in the social graph 200. Because the first user is no longer related to Taylor as a friend on the online social network, the first user may only have access to content objects posted by Taylor that are specified to be visible to the public. Furthermore, removal of the friend relation between the first user and Taylor may significantly reduce an affinity coefficient between the two users, which may significantly reduce the likelihood that a content object associated with Taylor will be presented to the first user in a newsfeed and the likelihood that the first user will be prompted to interact with Taylor. However, Taylor and third-party users may obtain knowledge about the first user's action in this case. For example, Taylor may visit the first user's profile interface and see a status indicating that he is not friends with the first user. As another example, a common acquaintance of the first user and Taylor may find the first user being absent from a list of common friends that she shares with Taylor on the online social network. The first user may reverse this change by adding Taylor as a friend on the online social network. This may involve sending Taylor a friend request.

If the first user clicks to select option 550 "block Taylor," the social-networking system 160 may not only unfriend the first user and Taylor but also prevent them from seeing each other's posts, tagging each other, inviting each other to events or groups, starting a conversation with each other, or adding each other as a friend. To fully reverse this change, the first user may have to unblock Taylor and then add Taylor as a friend. After providing one or more settings updates in update page 500 of the content-update interface, the first user may click on the save button 560 to save the updates, exit the update page 500, and return to the summary page 400 for further actions. Although FIG. 5 illustrates providing an update page allowing a first user to update privacy and content settings in order to see less of a particular entity in a particular manner, this disclosure contemplates providing an update page allowing a first user to update privacy and content settings in order to see less of a particular entity in any suitable manner.

FIG. 6 illustrates an example update page of an example content-update interface allowing a first user to update privacy and content settings in order to limit the visibility of the first user's content objects to a particular entity. If the first user clicks on the interactive element in section 430 of the summary page 400, the social-networking system 160 may redirect the first user to update page 600 of the content-update interface. In update page 600, the first user may provide one or more settings updates affecting the visibility of the first user's content objects to the particular entity. In the current use scenario, after breaking up with Taylor, the first user may desire that Taylor see fewer content objects associated with the first user on the online social network. The update page 600 may comprise a heading section 610 indicating the main function of the current interface. It may further comprise two options 620 and 630, each option comprising a title and a brief description of its effects. Option 620 may be marked with a checkmark to indicate that option 620 corresponds to the current or default privacy and content settings. If the first user takes no action in the current update page 600, option 620 "keep current privacy settings" may remain active. The social-networking system 160 may preserve the current privacy and content settings applicable to control the visibility of the first user's content objects with respect to Taylor. Taylor may continue to see the first user's content objects as before.

If the first user clicks to select option 630 "hide your posts from Taylor," settings updates may be applied such that Taylor's ability to access the first user's content objects is limited. The social-networking system 160 may make an en masse change to privacy settings for content objects posted by the first user such that the content objects become invisible to Taylor. As an example and not by way of limitation, the social-networking system 160 may identify one or more content objects posted by the first user that are currently visible to Taylor and add Taylor to a blocked list associated with each identified content object, the blocked list containing users that are specifically denied access to the content object. This change may have one or more exceptions. As an example and not by way of limitation, Taylor may still be able to access content objects posted by the first user that tags him, that are shared with the public, or that are shared on a profile interface of a mutual friend of the first user and Taylor. The social-networking system 160 may provide the first user an option to reverse this change, via the content-update interface, by restoring the affected privacy settings without notifying Taylor. The social-networking system 160 may further update one or more default privacy settings for a content-posting interface provided to the first user. When the first user posts a content object via the content-posting interface in the future, the social-networking system 160 may automatically deny Taylor access to the newly posted content object according to the updated default privacy settings. The first user may reverse this change by manually modifying default privacy settings associated with the content-posting interface without notifying Taylor. The first user may also make individual exceptions by modifying privacy settings for individual content objects. After providing one or more settings updates in update page 600 of the content-update interface, the first user may click on the save button 560 to save the updates, exit the update page 600, and return to the summary page 400 for further actions. Although FIG. 6 illustrates providing an update page allowing a first user to update privacy and content settings in order to limit the visibility of the first user's content objects to a particular entity in a particular manner, this disclosure contemplates providing an update page allowing a first user to update privacy and content settings in order to limit the visibility of the first user's content objects to a particular entity in any suitable manner.

Figure 7:
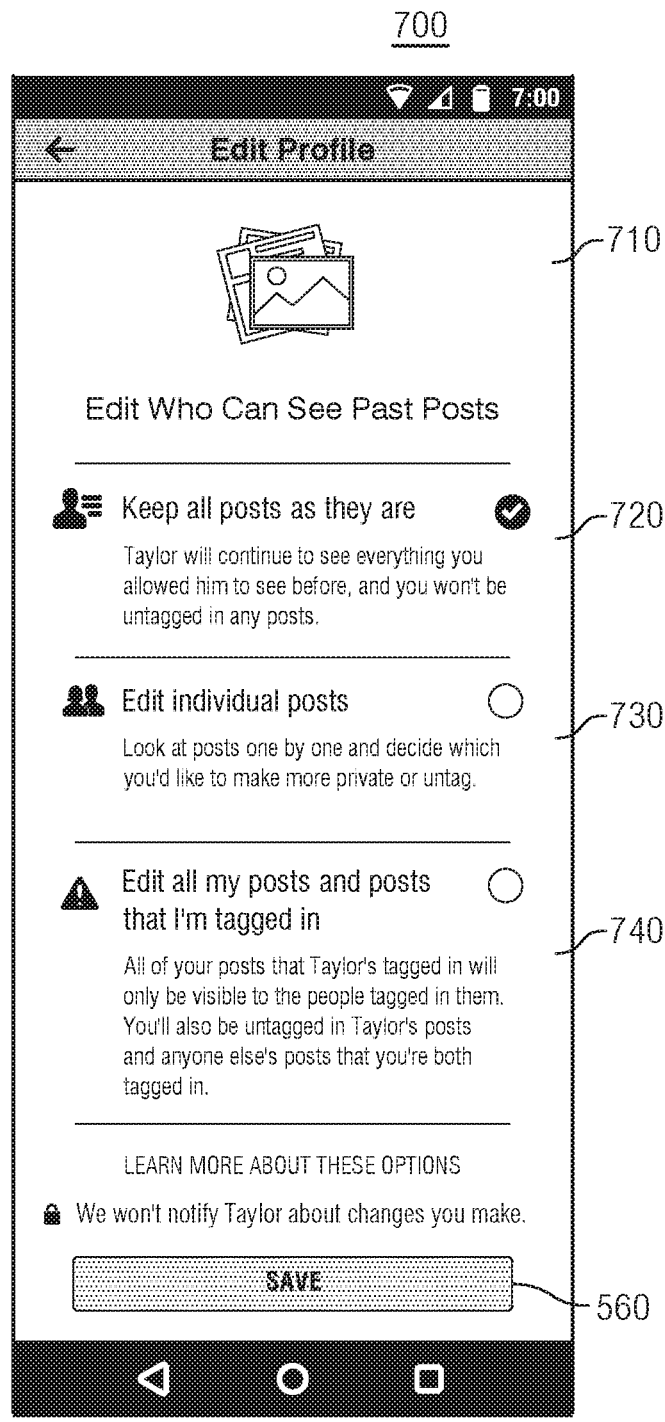
FIG. 7 illustrates an example update page of an example content-update interface allowing the first user to update privacy and content settings in order to control the visibility of content objects associated with the first user to third-party entities.

FIG. 7 illustrates an example update page of an example content-update interface allowing the first user to update privacy and content settings in order to control the visibility of content objects associated with the first user to third-party entities. If the first user clicks on the interactive element in section 440 of the summary page 400, the social-networking system 160 may redirect the first user to update page 700 of the content-update interface. In update page 700, the first user may provide one or more settings updates affecting the visibility of content objects associated with the first user to third-party entities. In the current use scenario, after changing her relationship status with respect to Taylor on the online social network, the first user may desire that third-party users see fewer content objects tagging both the first user and Taylor. The update page 700 may comprise a heading section 710 indicating the main function of the current interface. It may further comprise three options 720, 730, and 740, each option comprising a title and a brief description of its effects. Option 720 may be marked with a checkmark to indicate that option 720 corresponds to the current or default privacy and content settings. If the first user takes no action in the current update page 700, option 720 "keep all posts as they are" may remain active. The social-networking system 160 may preserve the current privacy and content settings applicable to control the visibility of content objects associated with the first user to third-party entities. Third-party entities may continue to see content objects tagging both the first user and Taylor as before.

If the first user clicks to select option 730 "edit individual posts," the social-networking system 160 may redirect the first user to an interface, which may present content objects associated with the first user one-by-one and allow the first user to specify settings updates to be applied to each content object. For a particular content object, the settings updates may include, for example, limiting access to only entities tagged in the content object, un-tagging the first user, un-tagging Taylor, another suitable settings update, or any combination thereof.

If the first user clicks to select option 740 "edit all my posts and posts that I'm tagged in," the social-networking system 160 may redirect the first user to an interface, which may provide the first user one or more candidate settings updates that may be applied to content objects en masse. The candidate settings updates may include, for example, limiting access to each content object posted by the first user and tagging Taylor to only those also tagged in the content object, un-tagging the first user from all of Taylor's content objects, un-tagging Taylor from all of the first user's content objects, un-tagging the first user from all of third-party entities' content objects that tag Taylor, another suitable settings update, or any combination thereof. The social-networking system 160 may provide the first user an option to reverse one or more of the above changes, via the content-update interface, by restoring one or more privacy settings or re-tagging the first user or Taylor on one or more content objects without notifying Taylor or any third-party entity. However, particular changes may not be reversible. For example, if the first user un-tags herself from a third-party entity's content object that is set to be accessible to only those tagged in the content object, the content object may become permanently inaccessible to the first user. The social-networking system 160 may provide a warning message before an irreversible change takes place. After providing one or more settings updates in update page 700 of the content-update interface, the first user may click on the save button 560 to save the updates, exit the update page 700, and return to the summary page 400 for further actions. Although FIG. 7 illustrates providing an update page allowing a first user to update privacy and content settings in order to control the visibility of content objects associated with the first user to third-party entities in a particular manner, this disclosure contemplates providing an update page allowing a first user to update privacy and content settings in order to control the visibility of content objects associated with the first user to third-party entities in any suitable manner.

Figure 8:
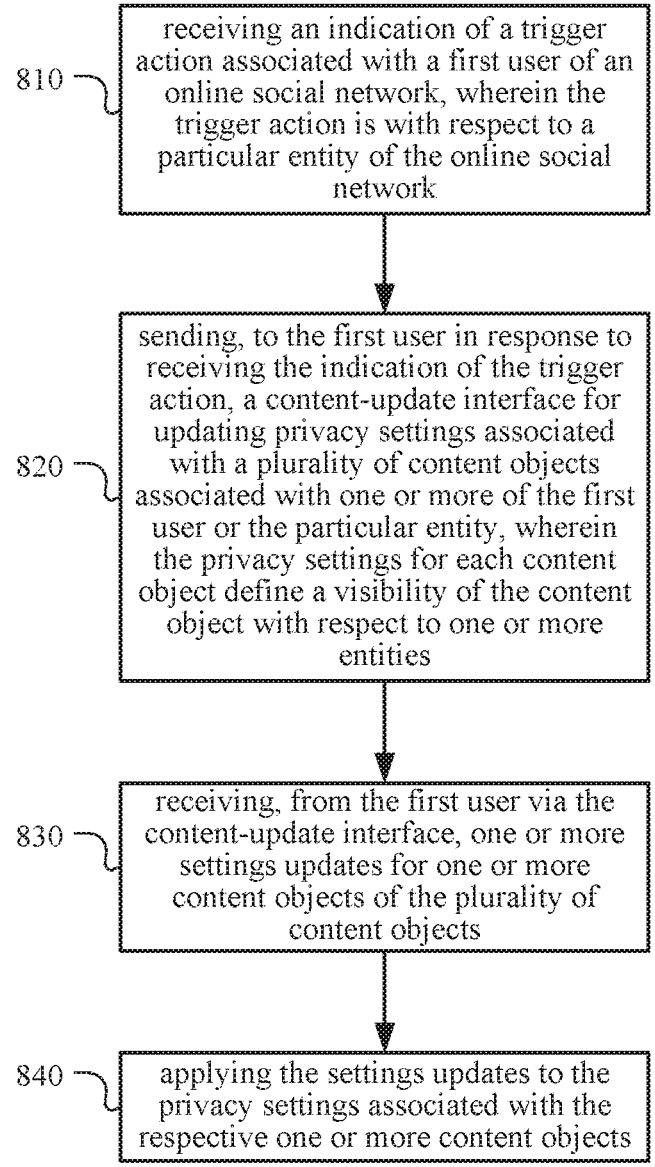
FIG. 8 illustrates an example method for implementing, in response to a trigger action, a content-update workflow that updates privacy and content settings based on user inputs.

FIG. 8 illustrates an example method 800 for implementing, in response to a trigger action, a content-update workflow that updates privacy and content settings based on user inputs. The method may begin at step 810, where the social-networking system 160 may receive an indication of a trigger action associated with a first user of an online social network, wherein the trigger action is with respect to a particular entity of the online social network. At step 820, the social-networking system 160 may send, to the first user in response to receiving the indication of the trigger action, a content-update interface for updating privacy settings associated with a plurality of content objects associated with one or more of the first user or the particular entity, wherein the privacy settings for each content object define a visibility of the content object with respect to one or more entities. At step 830, the social-networking system 160 may receive, from the first user via the content-update interface, one or more settings updates for one or more content objects of the plurality of content objects. At step 840, the social-networking system 160 may apply the settings updates to the privacy settings associated with the respective one or more content objects. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for implementing, in response to a trigger action, a content-update workflow that updates privacy and content settings based on user inputs including the particular steps of the method of FIG. 8, this disclosure contemplates any suitable method for implementing, in response to a trigger action, a content-update workflow that updates privacy and content settings based on user inputs including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photograph, but merely likes a second photograph, the social-networking system 160 may determine that the user has a higher coefficient with respect to the first photograph than the second photograph because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 9:
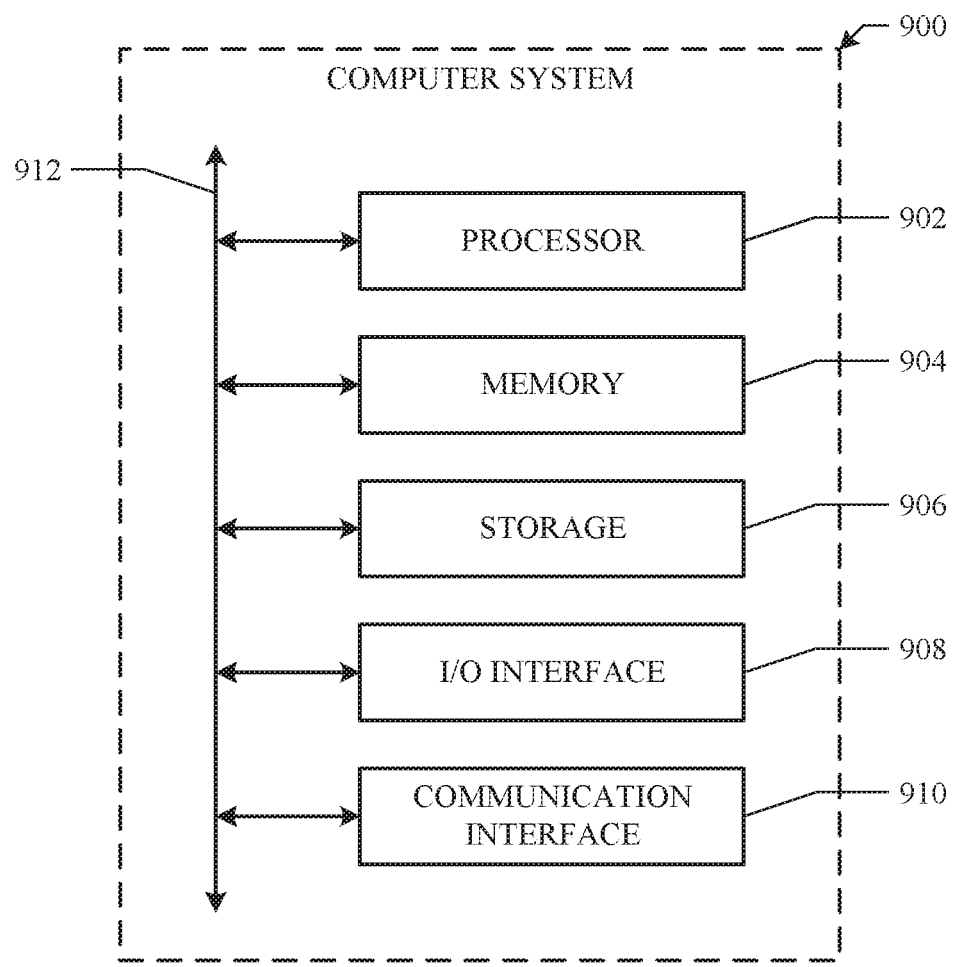
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, memory storage cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices of an online social network:
    receiving an indication of a trigger action by a first user of the online social network, wherein the trigger action is with respect to a second user of the online social network;
    sending, to a client system of the first user, automatically in response to receiving the indication of the trigger action, a content-update interface associated with the second user, wherein the content-update interface allows the first user to update, en masse, a plurality of privacy settings of a plurality of content objects, respectively, each of the content objects being associated with the first user and the second user, wherein the privacy settings of each content object controls an accessibility of the respective content object by one or more other users of the online social network;
    receiving, from the client system of the first user via the content-update interface, one or more settings updates for the plurality of privacy settings of the plurality of content objects, respectively, wherein the one or more settings updates change the accessibility of the respective content objects by the second user associated with the trigger action; and
    applying the settings updates to the plurality of privacy settings of the plurality of content objects, respectively.

2. The method of claim 1, further comprising:
    accessing a social graph comprising a plurality of nodes and a plurality of edges connecting the nodes, each of the edges between two of the nodes representing a single degree of separation between them, the nodes comprising:
        a first node corresponding to the first user; and
        a plurality of second nodes corresponding to a plurality of other users of the online social network, respectively,
    wherein the second user corresponds to a particular second node of the plurality of second nodes.

3. The method of claim 1, wherein the trigger action is associated with a change in a relationship status of the first user with respect to the second user.

4. The method of claim 1, wherein the trigger action is associated with updating one or more tags on one or more of the plurality of content objects with respect to the second user.

5. The method of claim 1, wherein the trigger action is associated with updating the plurality of privacy settings of one or more of the plurality of content objects with respect to the second user.

6. The method of claim 1, wherein the trigger action is a request by the first user to access the content-update interface associated with the second user.

7. The method of claim 1, wherein the content-update interface associated with the second user further allows the first user to update an affinity coefficient between the first user and the second user.

8. The method of claim 1, wherein the content-update interface associated with the second user further allows the first user to update one or more tags on one or more of the plurality of content objects associated with the first user and the second user.

9. The method of claim 1, wherein the content-update interface associated with the second user further allows the first user to create a content filter function for filtering one or more of the plurality of content objects.

10. The method of claim 1, wherein receiving the one or more settings updates for the plurality of privacy settings of the plurality of content objects, respectively comprises receiving a settings update changing an affinity coefficient between the first user and the second user to a baseline level.

11. The method of claim 10, wherein the changing of the affinity coefficient to a baseline level is reversible.

12. The method of claim 1, wherein receiving the one or more settings updates for the plurality of privacy settings of the plurality of content objects, respectively comprises updating one or more default privacy settings for a content-posting interface.

13. The method of claim 1, wherein receiving the one or more settings updates for the plurality of privacy settings of the plurality of content objects, respectively comprises:
   receiving settings updates for one or more content objects associated with the first user; and
   updating privacy settings for the one or more content objects associated with the first user to control accessibility of the respective content object by one or more other users of the online social network.

14. The method of claim 13, wherein the updating of the privacy settings for the one or more content objects is reversible.

15. The method of claim 1, wherein applying the settings updates comprises updating privacy settings for one or more content objects posted by the first user to have a visibility that is not visible to all entities except the second user.

16. The method of claim 1, wherein applying the settings updates comprises deleting each tag of the first user on each content object posted by the second user in which the first user is tagged.

17. The method of claim 1, wherein applying the settings updates comprises deleting each tag of the first user on each content object posted by an entity other than the second user in which the first user is tagged.

18. The method of claim 1, wherein applying the settings updates comprises updating privacy settings for each content object posted by the second user to have a visibility that is not visible to the first user.

19. The method of claim 1, wherein the indication of a trigger action further comprises:
   sending, to a client system of the first user in response to the trigger action, a content-update workflow prompt associated with the second user, wherein the content-update workflow prompt is selectable by the first user to access a content-update workflow associated with the second user; and
   receiving, from the client system of the first user, an indication the first user has selected to access the content-update workflow.

20. One or more computer-readable non-transitory storage media embodying software that is operable when executed to:
   receive an indication of a trigger action by a first user of the online social network, wherein the trigger action is with respect to a second user of the online social network;
   send, to a client system of the first user, automatically in response to receiving the indication of the trigger action, a content-update interface associated with the second user, wherein the content-update interface allows the first user to update, en masse, a plurality of privacy settings of a plurality of content objects, respectively, each of the content objects being associated with the first user and the second user, wherein the privacy settings of each content object controls an accessibility of the respective content object by one or more other users of the online social network;
   receive, from the client system of the first user via the content-update interface, one or more settings updates for the plurality of privacy settings of the plurality of content objects, respectively, wherein the one or more settings updates change the accessibility of the respective content objects by the second user associated with the trigger action; and
   apply the settings updates to the plurality of privacy settings of the plurality of content objects, respectively.

21. A system comprising: one or more processors; and a memory coupled to the processors comprising instructions executable by the processors, the processors operable when executing the instructions to:
   receive an indication of a trigger action by a first user of the online social network, wherein the trigger action is with respect to a second user of the online social network;
   send, to a client system of the first user, automatically in response to receiving the indication of the trigger action, a content-update interface associated with the second user, wherein the content-update interface allows the first user to update, en masse, a plurality of privacy settings of a plurality of content objects, respectively, each of the content objects being associated with the first user and the second user, wherein the privacy settings of each content object controls an accessibility of the respective content object by one or more other users of the online social network;
   receive, from the client system of the first user via the content-update interface, one or more settings updates for the plurality of privacy settings of the plurality of content objects, respectively, wherein the one or more settings updates change the accessibility of the respective content objects by the second user associated with the trigger action; and
   apply the settings updates to the plurality of privacy settings of the plurality of content objects, respectively.

* * * * *